United States Patent Office 3,312,541
Patented Apr. 4, 1967

3,312,541
HERBICIDAL COMPOSITION AND METHOD
John E. Katon and Lee A. Miller, Dayton, Ohio, assignors to Monsanto Company, St. Louis, Mo., a corporation of Delaware
No Drawing. Original application Dec. 30, 1960, Ser. No. 79,507, now Patent No. 3,244,742, dated Apr. 5, 1966. Divided and this application Oct. 20, 1965, Ser. No. 508,182
6 Claims. (Cl. 71—2.6)

This application is a division of application Ser. No. 79,507 filed Dec. 30, 1960, now U.S. Patent No. 3,244,742.

The present invention relates to esters and more particularly provides certain halogenated ether-esters and the method of preparing the same.

An object of the invention is the provision of new and valuable acrylates. Another object of the invention is the provision of esters of ether-substituted acrylates and (haloaryloxy)alkanols. Still another object of the invention is the provision of such esters from a propiolic compound. A further object is the provision of (haloaryloxy)alkyl β-hydrocarbyloxy- or β-halohydrocarbyloxy-acrylates. Still another objective of the invention is to provide, from a propiolate, compounds having biological toxicant utility, i.e., compounds which will serve as the essential effective ingredients of herbicidal, fungicidal and bactericidal compositions. The preemergent control of plant life wherein there are employed compositions comprising the presently provided esters is a further objective of the invention.

These and other objects hereinafter defined are provided by the invention wherein (haloaryloxy)alkyl ether-substituted acrylates are prepared by the addition reaction of a (haloaryloxy)alkyl propiolate and a hydroxy compound, substantially according to the scheme:

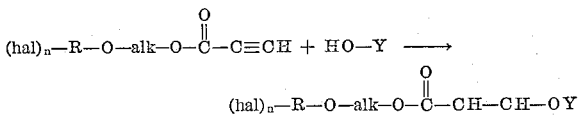

where hal is selected from the class consisting of chlorine and bromine, $n$ is a number of 1 to 5, R is an aromatic hydrocarbon radical of from 6 to 12 carbon atoms, alk is an alkylene radical of 2 to 4 carbon atoms, and Y is selected from the class consisting of saturated aliphatic and aromatic hydrocarbon radicals of from 1 to 12 carbon atoms and such radicals carrying halogen-substitution. By an aromatic hydrocarbon radical is meant a radical having an aromatic nucleus to which the halogen is attached and to which nucleus there may or may not be attached one or more lower alkyl groups.

The (haloaryloxy)alkyl propiolates which are employed for the preparation of the present ether-substituted propiolates are obtained by the esterification of propiolic acid with an (haloaryloxy)alkanol, as described in our copending application, Ser. No. 79,504, now U.S. Patent No. 3,097,086, filed of even date. For example, the reaction of propiolic acid with 3-(4-chlorophenoxy)propanol yields 3-(4-chlorophenoxy)propyl propiolate. According to the invention, reaction of this propiolate with a hydroxy compound, e.g., ethanol or phenol, yields either 3-(4-chlorophenoxy)propyl 3-ethoxyacrylate or 3-phenoxyacrylate, depending upon whether the hydroxy compound is ethanol or phenol. Since the reaction involves addition of the hydroxy compound HO—Y across the acetylenic bond of the propiolate, the nature of the reactants which are used for preparing the following compounds of the formula (hal)$_n$—R—O—alk—O—C(O)CH=CHOY can be readily ascertained:

I. 2-(2-, 3- or 4-chloro- or bromophenoxy)ethyl 3-methoxyacrylate or 3-propoxyacrylate
II. 2-(α-chloro- or bromo-β-naphthoxy)ethyl 3-phenoxyacrylate or 3-α-naphthoxyacrylate
III. 2-(2-, 3- or 4-chloro- or bromophenoxy)ethyl 3-(2-chloroethoxy)acrylate or 3-(4-chlorophenoxy)acrylate
IV. 3-(2-, 3- or 4-chloro- or bromophenoxy)propyl 3-hexyloxyacrylate or 3-dodecyloxyacrylate
V. 4-(2-, 3- or 4-chloro- or bromophenoxy)butyl 3-(2-fluoroethoxy)acrylate or 3-(3-iodopropoxy)acrylate
VI. 2-(2-, 3-, or 4-chloro- or bromophenoxy)ethyl 3-(2-, 3- or 4-chlorophenoxy)acrylate or 3-(2-, 3- or 4-bromophenoxy)acrylate
VII. 2-(3-chloro-4-methylphenoxy)ethyl 3-(2,3-dichlorophenoxy)acrylate
VIII. 2 - (2,4-dichlorophenoxy)-1-methylethyl 3-(2,4-dichlorophenoxy)acrylate
IX. 3-(3,5-dibromophenoxy)-2-methylpropyl 3-(2-chloro-4-butylphenoxy)acrylate
X. 2 - (2,3 - dichloro-4-ethylphenoxy)ethyl 3-(4,4,4-trichlorobutoxy)acrylate
XI. 2 - (2,5 - dichlorophenoxy)ethyl 3-(2,4-dichlorophenoxy)acrylate
XII. 3-(3,4-dibromophenoxy)propyl 3-ethoxyacrylate
XIII. 4-(2,6-dichlorophenoxy)butyl 3-benzyloxyacrylate
XIV. 2-(2-chloro-4-phenylphenoxy)ethyl 3-(2,4-dichlorophenoxy)acrylate
XV. 2-(2,3,4-, 2,3,5-, 2,4,5-, 2,4,6- or 3,4,5-trichloro- or tribromophenoxy)ethyl 3-(2-, 3- or 4-chlorophenoxy)acrylate
XVI. 2-(2-bromo-3,5-dichloro - 4 - hexylphenoxy)ethyl 3-butoxyacrylate
XVII. 2-(2,3,4,6 - tetrachloro- or tetrabromophenoxy)-ethyl 3-(2,3-difluorophenoxy)acrylate
XVIII. 2-(pentachloro- or pentabromophenoxy)ethyl 3-(2,4-dichlorophenoxy)acrylate
XIX. 3-(4-chloro-2,3-dimethylphenoxy)propyl 3-(α-naphthoxy)acrylate
XX. 2-(α-chloro-β-naphthoxy)ethyl 3-(α-chloro-β-naphthoxy)acrylate
XXI. 2-(2,4-dichloro-5-hexylphenoxy)ethyl 3-(pentachlorophenoxy)acrylate
XXII. 2-(2,4-dichlorophenoxy)ethyl 3-ethoxyacrylate
XXIII. 2-(2,3,4,5-tetrabromophenoxy)-1,2-dimethylethyl 3-xenyloxyacrylate
XXIV. 2-(2,4-dichlorophenoxy)ethyl 3-[2-(2,4-dichlorophenoxy)ethoxy]acrylate Particularly valuable for biological toxicant purposes are the chlorophenoxy alkyl 3-(chlorophenoxy)acrylates, i.e., compounds of the formula

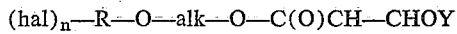

wherein $n$ is a number of from 1 to 5 and alk is an alkylene radical of from 2 to 4 carbon atoms. Compounds VI, VIII, XI, XV and XVIII above are illustrative of this class of compounds. The 2-(chlorophenoxy)ethyl or the 2-(chlorophenoxy)-1-methylethyl esters are of particular economic importance in that the 2-(chlorophenoxy)ethanols or the 2-(chlorophenoxy)-1-methylethanols used for preparing the propiolate reactants are derived from the readily available ethylene or propylene oxides. Of significance from the standpoint of not only commercial availability but also from the standpoint of very effective herbicidal activity are those in which the alcohol used in preparing the propiolate is derived from ethylene oxide, i.e., the aromatically chlorinated 2-(phenoxyethyl) 3-phenoxyacrylates of the formula

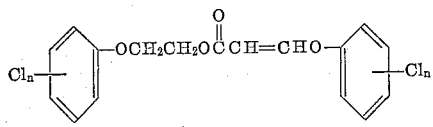

in which $n$ is an integer of from 1 to 5. In addition to some of the compounds of this formula which are shown above may be mentioned:

2-(pentachlorophenoxy)ethyl 3-(pentachlorophenoxy)acrylate which is prepared from 2-(pentachlorophenoxy)ethanol and pentachlorophenol;

2-(3,4,5-trichlorophenoxy)ethyl 3-(3,4,5-trichlorophenoxy)acrylate which is prepared from 2-(3,4,5-trichlorophenoxy)ethanol and 3,4,5-trichlorophenol;

2,(2,4-dichlorophenoxy)ethyl 3-(4-chlorophenoxy)acrylate which is prepared from 2-(2,4-dichlorophenoxy)ethanol and 4-chlorophenol; and 2-(4-chlorophenoxy)ethyl 3-(2,4-dichlorophenoxy)acrylate which is prepared from 2-(4-chlorophenoxy)ethanol and 2,4-dichlorophenol.

Reaction of the (haloacryloxy)alkyl propiolate with the hydroxy compound is generally conducted in the presence of a basic or acidic catalyst and in the presence of an inert liquid diluent or solvent. Preferably, an organic basic catalyst is employed. Examples of presently useful basic catalysts are, e.g., the heterocyclic nitrogen bases such as N-methylmorpholine, pyridine, quinoline, N-ethylpiperdine, picoline, quinaldine, 4-methylpyrimidine, or N-phenylpyrazole; the tertiary amines such as triethylamine, triamylamine, tri-tert-butylamine, N,N-dimethylaniline and N-benzyl-N-methylaniline; alkylene polyamines such as triethylenediamine; quaternary ammonium compounds such as benzyltrimethylammonium methoxide or tetrabutylammonium butoxide; alkali metal alkoxides such as sodium or potassium methoxide or propoxide, etc. The use of a diluent or solvent in the reaction will depend upon the nature of the reactants as well as upon the reaction conditions employed: When the hydroxy component is a liquid, a diluent need not be employed, unless this component and/or the propiolate is extremely reactive. In that case, the use of an inert diluent will serve to moderate the reaction. Activity of the (haloaryloxy)alkyl propiolate generally decreases wilth increase in the carbon content of the compound. Reactivity of the hydroxy component also depends upon the carbon content thereof as well as upon the presence of absence of branched structures and/or halogen. The quantity of catalyst will depend upon the nature of the reactants; obviously the more reactive reactants will require less catalyst than will the more sluggish reactants. Whether or not a diluent is used will likewise regulate catalyst quantity. Also variable is the temperature at which reaction is effected; for, here again must be taken into consideration the nature of the reactants, catalyst quantity, and whether or not a diluent is used. While some of the present addition reactions can be conducted at ordinary room temperature or even at decreased temperatures, generally heating of the reaction mixture will be needed. All of these variables, i.e., catalyst quantity, use of diluent and temperature conditions can readily be arrived at by easy experimentation. Very rapid reaction at room temperature, as evidenced by rapid temperature rise will show the need for a diluent, and/or lower temperature and/or less catalyst. Conversely, no reaction or only a very slow reaction at room temperature will indicate the use of more extreme conditions, i.e., extraneous heating and/or no diluent and/or more catalyst. Thus, arrival at optimum reaction conditions is simply a matter of routine procedure by one skilled in the art.

Inert liquids which are useful as diluents or solvents in the reaction are liquid hydrocarbons generally, halohydrocarbons, nitrohydrocarbons, and ethers, e.g., benzene, toluene, xylene, hexane, dichlorobenzene, nitrobenzene, ethylene dichloride, carbon tetrachloride, isopropyl ether, dioxane, etc. Generally, any organic material which is non-reactive with either the reactants or the products may be used. Since the reaction occurs by addition of one mole of the hydroxy compound with one mole of the propiolate, these reactants are advantageously employed in such stoichiometric proportions. However, an excess of either component may be used.

To recapitulate: For reaction of the (haloaryloxy)alkyl propiolate with the hydroxy compound, the two reactants are mixed together, preferably in the presence of a basic catalyst and in the presence or absence of an inert diluent or solvent at a temperature which may range from below room temperature to refluxing, say, 125° C., and the resulting mixture is allowed to stand until formation of the (haloaryloxy)alkyl ester of the ether-substituted acrylic acid has occurred.

The presently provided (haloaryloxy)alkyl ether-substituted acrylates are stable, rather high-boiling viscous liquids or waxy to crystalline solids which are useful as lubricant additives, as vulcanization accelerators for rubbers, as copolymerizing monomers with vinyl compounds in synthetic resin and plastics manufacture, and as biological toxicants, e.g., as herbicides, bacteriostats, fungistats and insecticides. They are particularly valuable as preemergent herbicides in that they possess a specificity of effect so that they can be used as de-weeders without adversely affecting the crop. The presently provided esters are noteworthy in that at low concentrations they prevent germination of crab grass without killing or substantially injuring the lawn grasses.

The invention is further illustrated by, but not limited to, the following examples:

*Example 1*

2-(2,4-dichlorophenoxy)ethyl propiolate was prepared as follows:

A mixture consisting of 20.7 g. (0.1 mole) of 2-(2,4-dichlorophenoxy)ethanol, 7.7 g. (0.11 mole) of propiolic acid, 2 drops of sulfuric acid and 100 ml. of benzene was stirred at reflux under a Dean-Stark apparatus for 4 hours. At the end of this time 1.8 ml. (100% theoretical) of water had collected in the water-trap. Accordingly, heating was discontinued and the reaction mixture was allowed to stand overnight. After diluting it with 100 ml. of ether, the reaction mixture was washed with water, aqueous sodium bicarbonate and water. Evaporation gave an orange oil which upon distillation gave the substantially pure 2 - (2,4 - dichlorophenoxy)ethyl propiolate, B.P. 146–8° C./0.6 mm., $n_D^{25}$ 1.5475, analyzing 50.08% carbon and 3.39% hydrogen as against 50.99% and 3.11%, the respective calculated values.

A mixture consisting of 5.2 g. (0.02 mole) of 2-(2,4-dichlorophenoxy)ethyl propiolate, 3.3 g. (0.02 mole) of 2,4-dichlorophenol, 50 ml. of benzene and 2 drops of N-methylmorpholine was heated at reflux for 12 hours. Evaporation of the solvent gave a pale yellow oil which, upon standing for a day, crystallized to an almost colorless solid. Thrice-repeated crystallization from methanol gave the substantially pure 2-(2,4-dichlorophenoxy)ethyl 3-(2,4-dichlorophenoxy)acrylate, M.P. 89.5–90° C., which analyzed 48.48% carbon and 2.95% hydrogen as against 48.37% and 2.87%, the respective calculated values. Infra-red analysis showed the presence of carbonyl, ether, ester, and olefinic and aromatic unsaturation and disclosed neither the hydroxy group nor the acetylenic triple bond.

*Example 2*

This example shows evaluation of the 2-(2,4-dichlorophenoxy)ethyl 3-(2,4-dichlorophenoxy)acrylate of Example 1 as a selective preemergent herbicide. Briefly, the chemical is applied in spray form to soil seeded to representative grasses and broad-leaf plants.

Aluminum pans were level filled with a good grade of top soil which had been screened through a ¼" wire mesh. The soil surface was then compacted to a depth of ⅜" from the top of the pan. A predetermined number of seeds each of morning glory, wild oat, brome grass, foxtail, crab grass, rye grass, radish, sugar beet, soybean, wild buckwheat, tomato, sorghum and pigweed were scattered on the soil surface and covered with soil to the pan top.

The planted pans, except for controls, were sprayed with an aliquot of an organic solvent containing the chemical to be tested. The tests were made at the rate of 5 lbs. per acre. After spraying, the pans were placed on sand in a bench in the greenhouse and the bench flooded with water to ½" above the sand level. The test pans of soil were allowed to absorb moisture through the perforated bottom until the surface was about ½ moist. The excess water was then drained off below the bench sand level. The surface of the test pans rapidly became completely moist by capillary action and was maintained adequately wet by sub-irrigation for the two week test period.

Observation of the pans at the end of that time showed that those which had been sprayed with the 5 lb. per acre solution of the 2-(2,4-dichlorophenoxy)ethyl 3-(2,4-dichlorophenoxy)acrylate showed complete suppression of morning glory, brome grass, radish, sugar beet, crab grass, pigweed and tomato. Wild oat and rye grass were not at all injured, whereas foxtail, soybean, wild buckwheat and sorghum showed from slight to moderate injury. On the other hand, the seeds which had been planted in the pan that had not been sprayed with the present test compound had emerged and the plants were in excellent condition.

In subsequent tests, the concentration of the test compound was progressively decreased to as little as ¼ of a pound per acre. At this concentration the radish, crab grass and pigweed failed to emerge, morning glory, sugar beet, soybean and tomato were moderately to slightly injured, and the following were not at all affected: wild oat, brome grass, rye grass, foxtail and sorghum. The 2-(2,4-dichlorophenoxy)ethyl 3 - (2,4-dichlorophenoxy)acrylate thus selectively attacked the broad-leafed plants at the low concentration; moreover, at the low concentration it inhibited germination of crab grass while not affecting the other grasses.

The present (haloaryloxy)alkyl ether-substituted acrylates are characterized by a high degree of efficacy in that they possess selective preemergent herbicidal efficacy at very low concentrations. Herbicidal compositions containing the present compounds are advantageously formulated by first preparing a solution thereof in an organic solvent and then adding the resulting solution to water containing an emulsifying agent to form an oil-in-water emulsion. Emulsifying agents which may be employed are those customarily used in the art for the preparation of oil-in-water emulsions, e.g., the higher alkylbenzenesulfonates, the long chained polyalkylene glycols, the long chained alkylsulfosuccinates, etc.

While the present compounds are most advantageously employed as herbicides and as other biological toxicants by incorporating them into an emulsion as herein described, they may also be incorporated into solid carriers such as clay, talc, pumice or bentonite to give compositions which may be applied either to infested areas or to locale which maye be subjected to infestation. They may also be dissolved in liquefied gases such as the fluorochloroethanes or methyl chloride and applied from aerosol bombs containing the solution.

What we claim is:

1. A preemergent herbicidal composition comprising an oil-in-water emulsion containing, as the essential effective ingredient a herbicidally effective amount of a compound of the formula

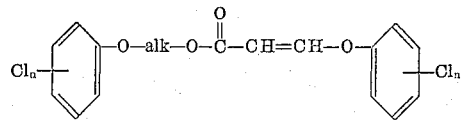

wherein $n$ is a number of from 1 to 5 and alk is alkylene of from 2 to 4 carbon atoms.

2. A preemergent herbicidal composition comprising an oil-in-water emulsion containing, as the essential effective ingredient a herbicidally effective amount of a compound of the formula

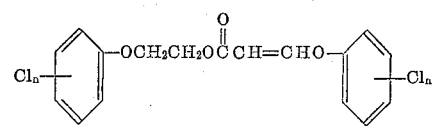

in which $n$ is an integer of from 1 to 5.

3. A preemergent herbicidal composition comprising an oil-in-water emulsion containing, as the essential effective ingredient a herbicidally effective amount of 2-(2,4-dichlorophenoxy)ethyl 3-(2,4-dichlorophenoxy)acrylate.

4. The method of inhibiting plant growth which comprises applying to soils normally supporting said growth, a toxic quantity of a preemergent herbicidal composition comprising as the essential effective ingredient a compound of the formula

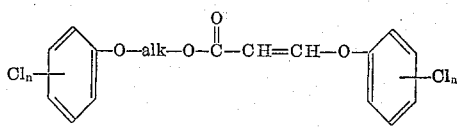

wherein $n$ is a number of from 1 to 5 and alk is alkylene of from 2 to 4 carbon atoms.

5. The method of claim 4 in which the effective ingredient is a compound of the formula

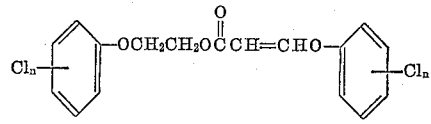

in which $n$ is an integer of from 1 to 5.

6. The method of claim 4 in which the effective ingredient is 2-(2,4-dichlorophenoxy)ethyl 3-(2,4-dichlorophenoxy)acrylate.

References Cited by the Examiner

UNITED STATES PATENTS 2,396,513  3/1946  Jones _____ 260—473
2,765,224  10/1956  Lamfrech _____ 71—2.3

OTHER REFERENCES

Matolesy et al., Chemical Abstracts, vol. 54, No. 8, April 1960, column 7960.

Migrdichian, Organic Synthesis, vol. 2, pp. 987–992 (1957).

ELBERT L. ROBERTS, *Primary Examiner.*

LEWIS GOTTS, JAMES O. THOMAS, JR, *Examiners.*